Inventors
Heinrich Theenhausen
Wilhelm Siebrasse

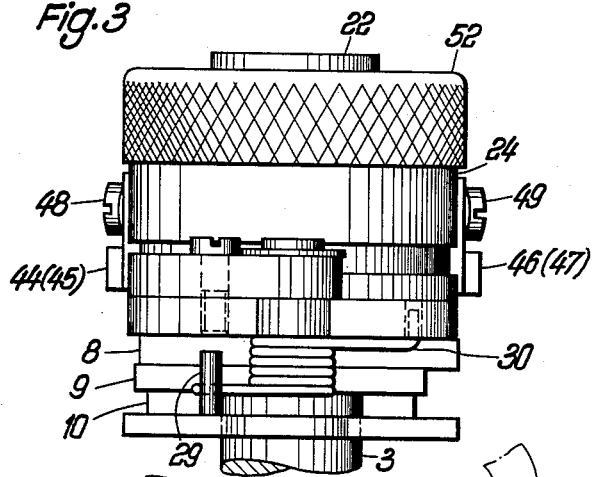
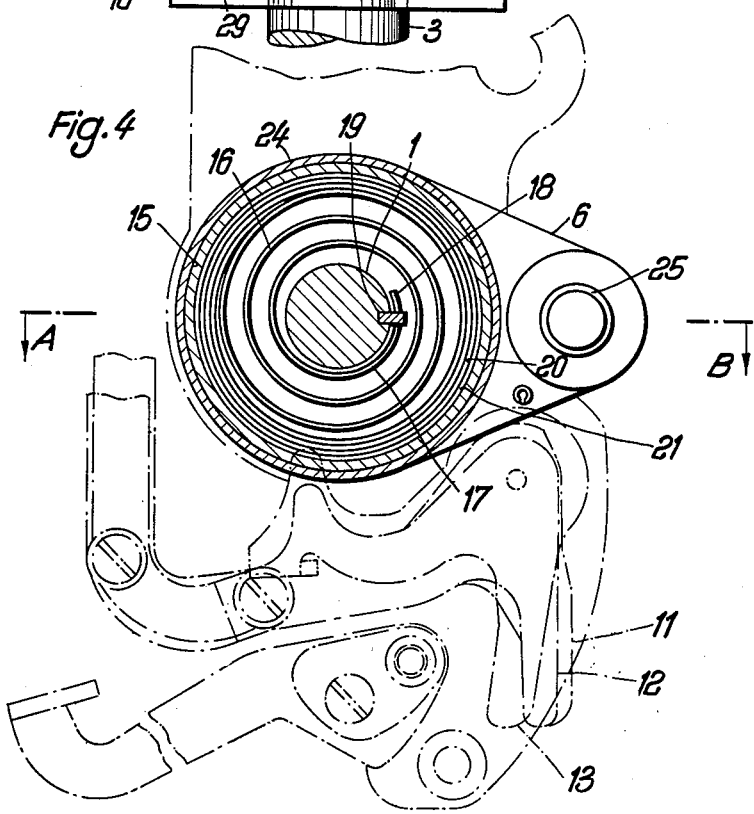

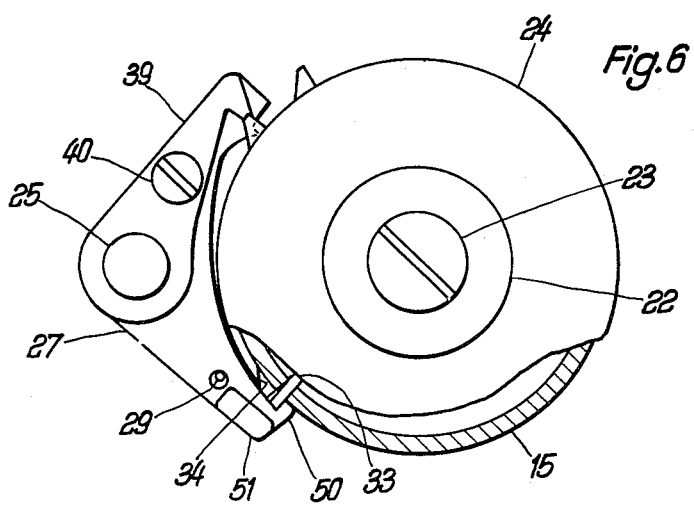
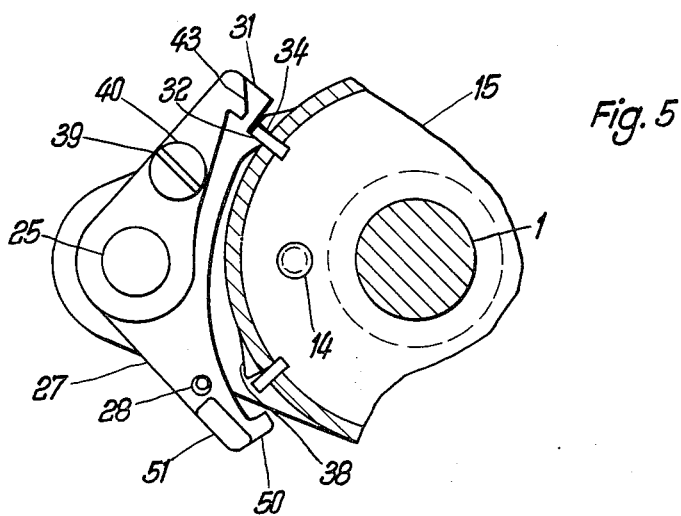

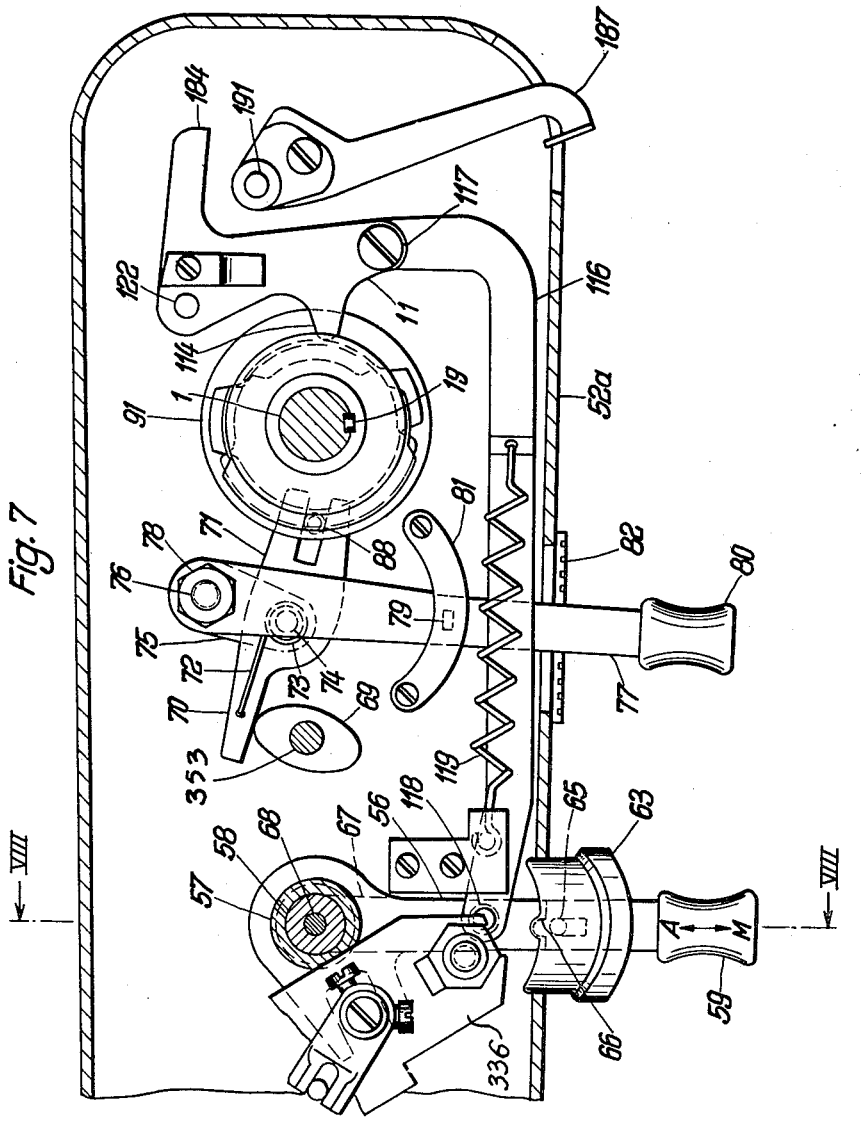

MANUAL ←→ AUTOMATIC

*Inventors*
*Heinrich Theenhausen*
*Wilhelm Siebrasse*

Dec. 22, 1964  H. THEENHAUSEN ETAL  3,162,156
ZIGZAG SEWING MACHINE WITH CONTROL DEVICE FOR PRODUCING
COMPOSITE ENCLOSED-AREA STITCH PATTERNS
Original Filed Aug. 12, 1959  9 Sheets-Sheet 6

Inventors
Heinrich Theenhausen
Wilhelm Siebrasse

Dec. 22, 1964  H. THEENHAUSEN ETAL  3,162,156
ZIGZAG SEWING MACHINE WITH CONTROL DEVICE FOR PRODUCING
COMPOSITE ENCLOSED-AREA STITCH PATTERNS
Original Filed Aug. 12, 1959  9 Sheets-Sheet 8

Inventors:
Heinrich Theenhausen
Wilhelm Siebrasse

Inventors:
Heinrich Theenhausen
Wilhelm Siebrasse

United States Patent Office 3,162,156
Patented Dec. 22, 1964

3,162,156
ZIGZAG SEWING MACHINE WITH CONTROL DEVICE FOR PRODUCING COMPOSITE ENCLOSED-AREA STITCH PATTERNS
Heinrich Theenhausen, Bielefeld, and Wilhelm Siebrasse, Heepen, near Bielefeld, Germany, assignors to Anker-Phoenix Nähmaschinen A.G., Bielefeld, Germany, a corporation of Germany
Original application Aug. 12, 1959, Ser. No. 833,216. Divided and this application Dec. 27, 1962, Ser. No. 247,729
Claims priority, application Germany Aug. 14, 1958
6 Claims. (Cl. 112—158)

Our invention relates to an automatic zigzag sewing machine with control means for producing fancy stitch patterns of the enclosed-area type, particularly buttonholes.

This application is a division of copending application Serial No. 833,216, filed August 12, 1959, now issued as Patent No. 3,083,657, patented April 2, 1963.

There are known zigzag sewing machines in which the stitch width (transverse to the feed direction), the stitch length (in the feed direction), the stitch-area position as well as the feed direction are automatically controlled by respective cam disks driven from the mechanism of the sewing machine. Such an automatic sewing machine affords the production of fancy stitch patterns that are closed upon themselves, for example buttonholes. However, in these prior machines the control of the slider which determines the needle-bar position and the feed direction is relatively slow and they therefore inevitably produce intermediate stitches which do not belong to one or the other component (such as the side bars and the cross tacks of a buttonhole) of the pattern to be produced, so that the appearance of the completed pattern is unclean at the transition localities. This slow control of the needle-bar position and of the material feeder device is a consequence of the gradual ascending and descending portions in the contour of the control cams since, in order to secure the satisfactory functioning of all machine parts, these cams must not possess abrupt transitions.

The known control devices permit automatic control of the side-bar and cross-tack stitches and thus produce buttonholes of different lengths. However, the automatically rotating set of control cams can be stopped only by stopping the sewing machine itself or by shifting a manual control member for the stepping switch mechanism into its inactive position. For these reasons, the person using the machine must exercise considerable attention for stopping the set of control cams only in a definite position of its circumference if he is to prevent a sewing over of an already finished seam. Furthermore, when the over-sewing of a buttonhole or other pattern completely closed upon itself is completed, it is difficult with the known device to commence the sewing of a new buttonhole, because the proper starting point of the new cam actuated cycle becomes inaccurately located or may have been passed, with the result that the seams of the buttonholes may appear unclean.

It has also been proposed to produce buttonholes by means of automatically rotating control cams in sewing machines in such a manner that only a portion of the entire area pattern is produced automatically whereas another portion of the pattern is completed while the control cams are standstill. For this purpose, the control mechanism is provided with a cam disk which carries a dog pin for prematurely disconnecting the cam drive. A special manual setting member is provided to permit thereafter turning the cam disks by hand in order to complete the closed-type sewing pattern, and thereafter to initiate renewed operation of the automatic cam drive.

However, this device does not permit the operator, when using one and the same set of cams, to produce buttonholes of different lengths, because for each cam set there is a predetermined constant transmission ratio between the arm shaft and the cam drive shaft for rotation of the individual control cams.

It is therefore an object of our invention to improve control devices of the above-mentioned type in zigzag sewing machines in such a manner as to facilitate and improve the production of buttonholes or other enclosed-area patterns by means of automatically rotating cam disks while also securing a more accurate and cleaner appearance of the buttonhole or other pattern without placing exacting requirements upon the attention or skill of the operating sewing personnel.

It is a further object of the invention to provide a control device for a zigzag sewing machine which effects an abrupt switching action relative to the control cams from one control sector of a cam, which produces one portion of a compound pattern, to another control sector of the control cam which produces another portion of the pattern, and thus to achieve automatic and accurate transition between controlled sewing cycles, or between portions of the same sewing cycle, while retaining a gradual contour change in the shape of the cam surface itself.

To achieve these objects, our invention is predicated upon the use of a zigzag sewing machine with an automatic control device for the production of closed-area stitch patterns, particularly buttonholes, with the aid of a rotating set of cams for automatically controlling the needle-bar movements and the feed of the material being sewed. Machines of this general type are more fully described in copending applications Serial Nos. 514,178, 515,160, 660,878, and 655,555, all assigned to the assignee of the present invention, now U.S. Patent Nos. 2,929,344, 2,966,868, 3,043,253, and 3,055,324, respectively. Relating to such a machine it is a feature of our invention to provide a circularly acting force-storing device between the portion of the control means driven from the arm shaft of the machine on the one hand and the set of cams for controlling the stitching width, the stitching area and the feed on the other hand, the force storer having the effect of producing an abrupt switching of the control motion from one control sector to the next sector.

By virtue of the abrupt jump in the control of the cams, from one control sector to the next, any possibility of intermediate stitches forming between the individual pattern stitches proper, such as the side-bar stitches and the cross-tack stitches of a buttonhole is eliminated.

In order to avoid further disadvantages of the known methods and devices for producing closed patterns such as buttonholes by means of automatically rotating control cams, we further provide, according to another feature of our invention, an automatic coupling device which renders the driving means selectively active and inactive in one and the same position of the set of cam disks.

The latter feature affords the considerable advantage with automatically rotating control cams that certain sewing-stitch patterns, for example the last side-bar stitches of a buttonhole, are controlled while the set of cams is at standstill. This is particularly significant in view of the fact that different fabrics or other materials to be sewed are subjected to respectively different amounts of feed motion even though the cam control may call for a constant feed. Furthermore, differences may occur between the forward and reverse travel of the fabric when producing enclosed-area stitch patterns, and such difference scan be compensated for with the present invention by virtue of the fact that the last portion of the sewing travel is controllable while the set of cams remains at rest.

The invention will be further described with reference to two embodiments of control devices according to the invention, illustrated by way of example on the accompanying drawings, in which:

FIG. 3 is a lateral view of the device.

FIG. 4 illustrates a top view of the device partly in cross section along the line C–D indicated in FIG. 1.

FIGS. 5 and 6 are top views cut away to show details of the same control device.

FIG. 7 is a sectional top view onto part of the sewing machine of FIG. 14 with the top housing removed to show the control device for positioning of the stitching area and for the motif frequency.

In the copending application Serial No. 515,160, filed June 13, 1955, by Heinrich Theenhauser and Otto Wank, assigned to the assignee of the present invention, there is described a zigzag sewing machine whose control cams are driven from the arm shaft by means of a cam mechanism, with a stepping switch and a roller coupling interposed between the arm shaft and the cam shaft. The embodiments illustrated in the present application and described presently relate generally to a machine of the type illustrated and described in that copending application.

Figure 14:
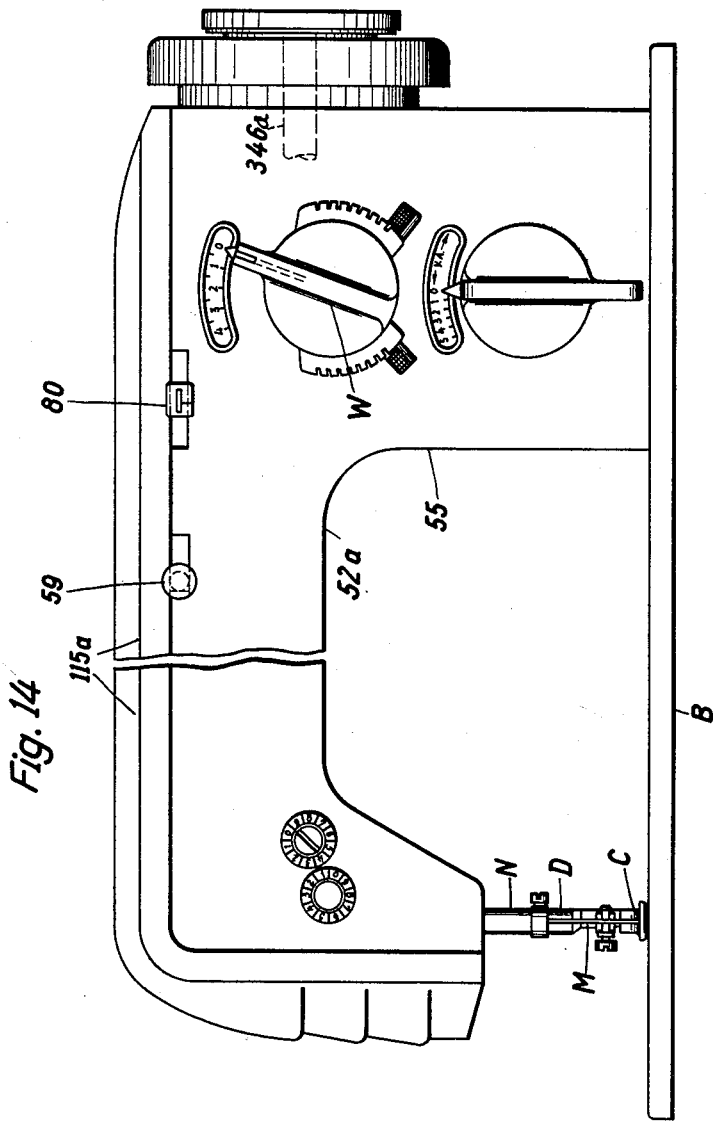
FIG. 14 is a front view, seen from the operator's position, of a zigzag sewing machine according to the invention.

In accordance with the conventional design of sewing machines, those illustrated and described herein have a base B (FIG. 14) on which a machine housing 55 is mounted. This housing 55 forms a hollow standard joined with the base and has a horizontal hollow arm portion 52a (FIGS. 7, 8), which remote from the standard, merges with a dependent needle-bar housing located above, and upwardly spaced from the sewing area on the top surface of the base. The interior of the housing 55 comprises the needle-bar drive mechanism as well as most of the parts appertaining to the control mechanism according to the invention. The open top of the housing is closed by a hinged or removable cover 115a. The conventional presser foot C forms an exchangeable part of an assembly D which extend vertically upward into the housing where it comprises a vertical rod P, shown in FIGS. 14 and 15. As usual, the presser-foot assembly can be lifted and lowered. The vertically reciprocable needle bar N (FIGS. 14, 15) carrying the sewing needle M extends parallel to the presser-foot assembly. Its operation for straight sewing is as usual and is therefore not further described.

Figure 15:
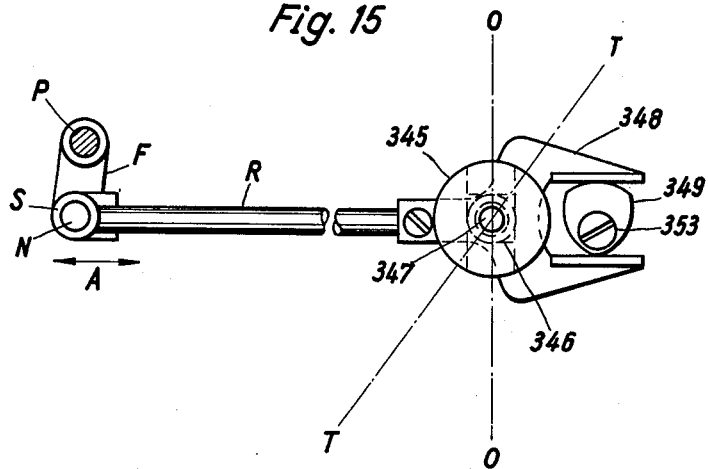
FIG. 15 is a plan view of the stitch control fork and related parts.

Aside from its vertical reciprocations, the needle bar N is also capable of lateral swinging movements as required for zigzag operation. These lateral movements occur about the axis of the presser-foot rod P in a horizontal direction substantially parallel to the plane of illustration of FIG. 14, and they are accompanied by a corresponding swinging movement of the presser foot. The needle bar N is vertically slidable in a bearing sleeve S (FIG. 15). Sleeve S forms part of a swing frame F which is mounted on the presser-foot rod P and is rotatable together with rod P about the vertical axis of rod P. During straight sewing the swing frame F is stationary, but for zigzag work an oscillating motion is imparted to the frame F by means of a connecting rod R which extends through the horizontal arm portion 52a of the machine housing 55 to an assembly of control mechanisms mounted in the housing.

It will be recognized from FIG. 15 that the zigzag stitching width in the directions of the double-headed arrow A corresponds to the amplitude of any oscillations transmitted by rod R to swing frame F, and that the stiching location or area is determined by the center or zero position of these oscillations. The stitch controlling oscillations come about and are controlled as follows:

During the machine operation, a continuously rotating cam 349 acts upon glide faces of a stitch control fork 348 with which the rod R is connected. The fork 348 has a pivot pin 347 on which a slide block 346 is revolvable. The slider 346 is guided in a groove (shown in broken lines) of a slideway member 345. Member 345 is displaceable in two ways, namely angularly about its axis and also linearly. Assume first that the member 345 occupies the illustrated position of FIG. 15 in which its groove has the direction of the indicated axis O—O. When the cam 349 is rotating, the fork 348 and rod R will oscillate about the axis of the needle bar N while the slide block 346 will reciprocate along the groove of member 345. Hence no swinging motion is transmitted to the needle bar and the lateral stitching width is zero.

Figure 10:
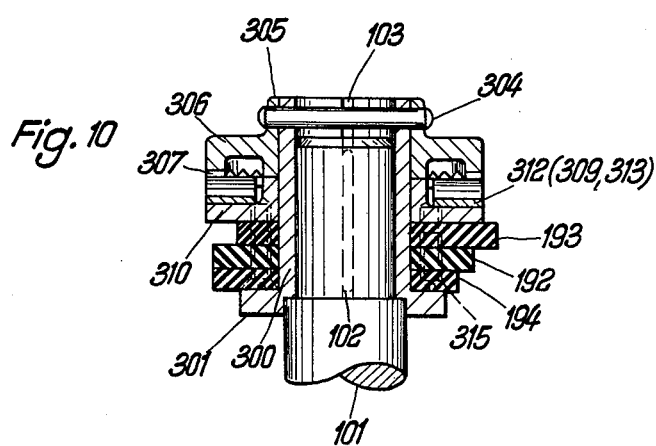
FIG. 10 is a partly sectional view of the automatic control device for the stitching-area position, the stitching width, and the material feed.
Figure 11:
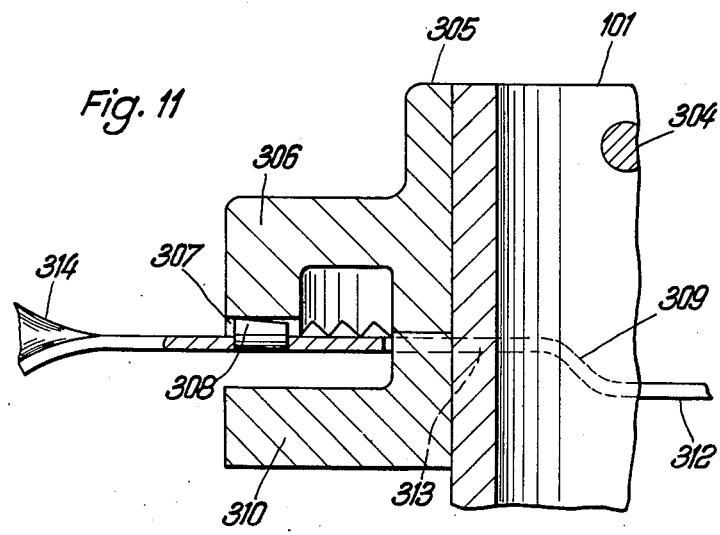
FIG. 11 is a partially sectional view of the coupling device.
Figure 12:
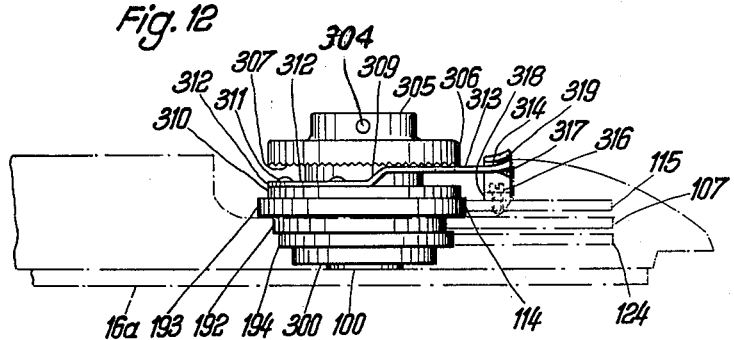
FIG. 12 shows in lateral view the automatic control device for the stitching-area position, the stitching width, and the feed.
Figure 13:
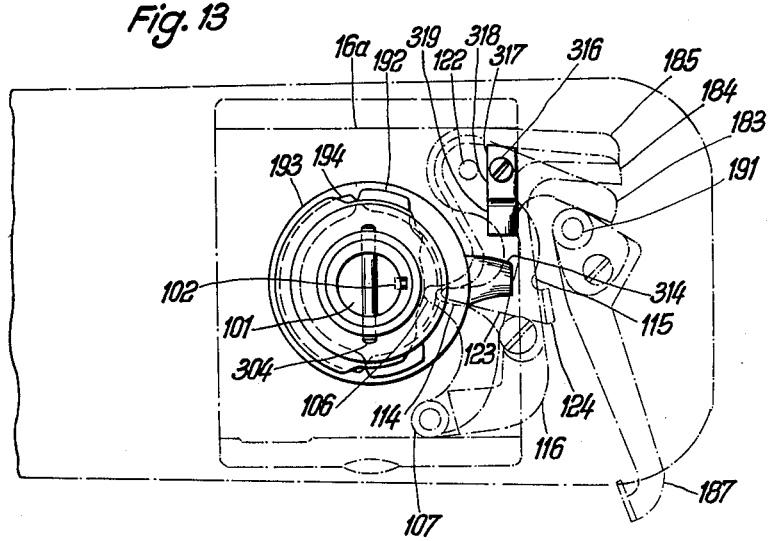
FIG. 13 shows the device of FIG. 2 in plan view.

Now assume that the member 345 is turned clockwise (as viewed in FIG. 15) so that the groove extends along the axis T—T. Then during the oscillations of fork 348 a lateral component of motion is transmitted through rod R to the swing frame F so that the needle bar N will oscillate about the axis of presser-foot rod P with an amplitude dependent upon the amount of angular displacement of member 345 from the zero axis O—O. In this manner, any desired amplitude and hence stitching width can be adjusted within the available range. The angular adjustment of slide-way member 345 is effected either manually by setting a width control knob W (FIG. 14) or automatically by operation of a selected, exchangeable cam disk 192 (FIG. 10), depending upon whether a control member 59 is placed in "manual" or "automatic" position.

Referring to FIG. 15, the slide-way member 345 is further capable of linear displacement toward or away from the presser-foot rod P. Any such displacement is shared by the pivot pin 347 of the stitch control fork 348 so that the center position or area of the oscillations transmitted from cam 349 to the needle bar N is shifted accordingly. The slideway member 345 has a pivot mounted on a slide plate 336 (FIG. 7), and this plate can be shifted either manually by a control lever 56, 59 (FIGS. 8, 14) or by the cam disk 193 acting through link 116, thus controlling the stitching area.

Figure 16:
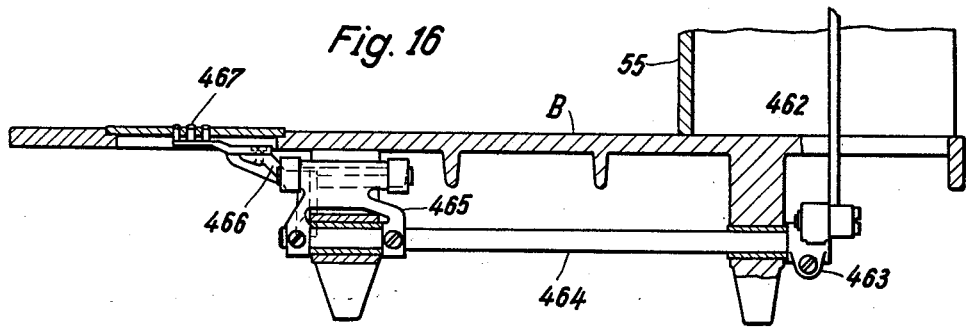
FIG. 16 is a fragmentary front view, in section, of the material feeding device.

The automatic control of the material feed is carried out by the cam disk 194 acting upon the feeder fork arm 462 (FIG. 16) through the medium of cam feeler lever 124 and through a series of linkages such as are more fully described and illustrated in the above-mentioned copending application Serial No. 665,555 of Albert Klaar et al., assigned to the assignee of the present invention. During rotation of the arm shaft 346a (FIG. 14) an eccentric (not illustrated) imparts lateral deflections to the feeder fork 462. Depending upon the position of a movable block (not illustrated), the feeding fork 462 then deflects in its longitudinal direction or transversely thereto as determined by its guidance in a slideway of the aforementioned movable block. The lifting motion, constrainedly following therefrom, is transmitted through the crank 463 and the shaft 464 onto the feeder crank 465 (FIG. 16) which acts upon the material pusher 467 through the pusher carrier 466.

The device shown particularly in FIGS. 1 to 6 serves for automatically controlling the production of stitch patterns which are closed upon themselves, and particularly for the production of buttonholes which are composed of two "side bars" along the buttonhole opening and two "cross tacks" at the respective ends of the buttonhole. The drive shaft 1 (FIG. 1) of the control device has a central bore 2 engaged by a stub shaft 3 driven preferably from a stepping mechanism as exemplified by the one shown in FIG. 9 and described further below. The stub shaft 3 is journalled in the arm structure 4 of the sewing machine and, when in operation, entrains the drive shaftt 1 for stepwise motion. The drive shaft 1 forms several steps with annular shoulders and is guided in the correspondingly stepped base plate 6 of the mechanism. The base plate 6 is firmly secured to the machine arm 4 by bolts or other suitable means (not illustrated). The cam disks 8, 9 and 10 are rotatably journalled on the extension 7 of the drive shaft and these disks are, namely a cam disk 8 for controlling the stitching area position, a cam disk 9 for controlling the stitching width, and a cam disk 10 for controlling the stitching length and the feed direction. The cams cooperate with respective cam followers 11, 12 and 13 (FIG. 4) and are connected by a screw bolt 14 (FIG. 1) with a control member 15 mounted on drive shaft and designed as described below to serve as a spring housing. Located within the member 15 is a spiral spring 16 serving as a force storer. The innermost turn 17 of spring 16 is provided with a rectangular hole 18 (FIG. 4) engaged by an entrainer wedge 19 of the drive shaft 1. The outermost turn 20 of the spiral spring 16 is fastened to the inner wall 21 of the control member 15. A sleeve 24, fastened to drive shaft 1 by means of a clamping plate 22 and a screw 23, covers the spring 16 as well as a portion of control member 15.

Riveted to the base plate 6 (FIG. 1) is a pin 25 upon which a sleeve 26 is seated. Joined with the sleeve 26 is a latch lever with two arms 27 anad 31 (FIG. 2) which, together with sleeve 26, can perform pivotal motion about the axis of pin 25. The latch lever has a bore 28 in lever arm 27 (FIGS. 2, 5, 6) engaged by one end of a helical spring 30 whose other end abuts against a pin 29 fastened to the base plate 6 (FIGS. 3, 6). The spring 30 imposes upon the latch lever 27, 31 a biasing force in the clockwise direction relative to FIG. 2 so that a latch nose 32 of lever arm 31 can catch behind a stop 34 (FIGS. 2, 6) of control member 15, the stop 34 constisting of rubber or synthetic material.

Disposed on the outer periphery of control member 15 are further stops 35 to 38 (FIG. 2) corresponding to further closed-type stitch patterns to be produced. Rotatably seated on the sleeve 26 (FIG. 1) is a release lever 39 (FIGS. 1, 2, 5, 6) which is adjustable on the arm 31 of the latch lever by means of a screw 40. The levers 27, 31 and 39 are prevented from axial displacement by means of a lock washer 42 engaging a peripheral groove 41 of the pivot pin 25.

The release lever 39 has a nose cooperating with dogs 44 to 47 which are mounted on the periphery of the sleeve 24 and are displaceable along the periphery and adapted to be fastened in the proper positions by means of fastening screws 48, 49. The arm 27 of latch lever 27, 31 merges into a hook-shaped latch nose 50 for cooperation with the stops 34 to 38. The latch lever 27, 31 carries a manually actuable extension 51 (FIGS. 2, 5, 6) which serves to adjust the starting point of a compound stitch pattern, such starting point being for example, the first side bar of a buttonhole. The upper portion 52 of sleeve 24 (FIG. 3) is knurled to facilitate manual manipulation.

The operation of the control device described so far is as follows.

Figure 1:
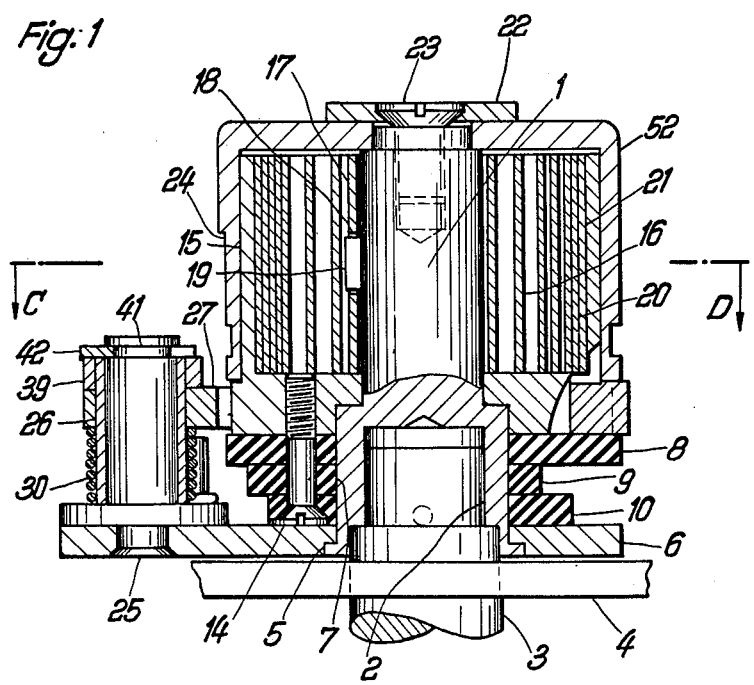
FIG. 1 is a cross-sectional view of the first control device, the section being taken along the line A–B indicated in FIG. 4.
Figure 2:
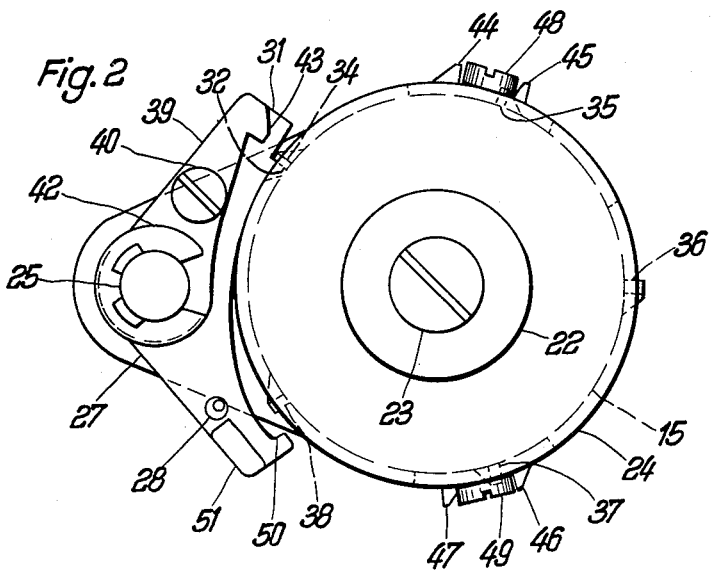
FIG. 2 show a top view of the same device.

The shaft 1 of the control device is driven counterclockwise relative to FIG. 4 from the arm shaft 346a (FIG. 14) through conventional means, preferably worm gears, and through an intermediate stepping mechanism 91 (FIG. 9) acting through step shaft 3. At the beginning of the sewing operation for producing a buttonhole, such counterclockwise rotation of shaft 1 places the spiral spring 16 under tension by means of the entrainer wedge 19 mounted on shaft 1. The spiral spring 16 has a slight initial tension and becomes wound up when the shaft 1 with its wedge 19 commences rotating counterclockwise (relative to FIG. 4). The control member 15, which forms the housing for the spiral spring 16, is prevented from rotating by means of the stop 34 (FIG. 2, 5) which is engaged by the latch nose 32 of the latch lever 27, 31 biased clockwise (relative to FIG. 5) by the helical spring 30 (FIG. 1, 3). Consequently, the control cams 8, 9 and 10, and thus also their respective followers 11, 12 and 13 (FIG. 4) are kept arrested in their starting positions while the first side bar of a buttonhole is being produced, namely in the first control position of the control cams 8, 9 and 10.

As soon as the nose 43 of release lever 39 runs onto the slanting dog 44 of the sleeve 24 driven counterclockwise from shaft 1 (relative to FIGS. 2, 5, 6), the latch nose 32 of latch lever 27, 31 is withdrawn from the stop 34 of the control member 15. As a result, the control member 15, carrying the control cams 8, 9, 10, is turned counterclockwise (relative to FIGS. 2, 5 and 6) by the action of the force-storing spring 16 to such an extent that the stop 38 of control member 15 is caught by the hook-shaped latch nose 50 of lever arm 27, thus preventing a further rotation of the control member 15. This rotary motion of control member 15 from nose 32 to nose 50, however, is so slight that it does not release any switching movement of the control cams 8, 9 and 10. As soon as the dog 44 has run beyond the nose 43 of release lever 39, lever 39 has been pivoted counterclockwise to disengage latch nose 32 from stop 34. The control member 15, biased by the driving force of the wound-up spiral spring 16, is thus released and turns impactwise in counterclockwise direction until the stop 35 (FIG. 2) abuts against the latch nose 32 of latch lever arm 27. This rotary jump of member 15 causes an abrupt rotary switching of the cam surfaces of control cams 8, 9 and 10, relative to their cam followers, from the first to the second cam control position, the latter of which controls the stitching of the first cross tack of the buttonhole. This abrupt switching of the cams prevents the formation of undesirable intermediate stitches that belong neither to the first side bar nor the first cross tack of the buttonhole being sewn.

Since, in comparison to the side bars of the buttonhole, only a few cross-tack stitches must be made, the pair of dogs 44 and 45 for producing the required control movements, as well as the pair of dogs 46 and 47 which follow at some distance therefrom, are located closely behind each other and the relative location of each pair of dogs along the periphery of the sleeve 24 is adjustable by means of respective screws 48, 49 for permitting a correction of the individual buttonhole side-bar lengths.

The next following control operations for producing the second side bar and the second cross tack as well as the final sewing-over of the buttonhole take place in a manner analogous to that described above. The drive shaft 1 performs a single full revolution during production of a single buttonhole. For that reason, all stops 34 to 38 of each control member 15 come into engagement once with the latch noses 32 and 50 of the latch-lever arms 27, 31. After completion of a full revolution of the drive shaft 1, the control member 15 with control cams 8, 9 and 10 has also performed a full revolution so that the pre-tensioning of the spiral spring 16, adjusted with such pre-tension prior to the first control operation, is preserved.

The handle portion 51 of the latch lever 27, 31 as well as the knurled portion 52 of the sleeve 24 can be actuated in order to adjust the beginning location of a stitching pattern (in the present example the start of the first side bar of a buttonhole) and also to adjust the pre-tension of the spiral spring 16.

Figure 8:
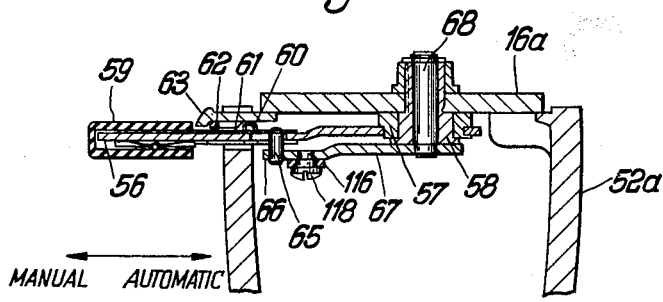
FIG. 8 is a lateral, sectional view of the control device for the position of the stitching area, the section being taken along the line VIII—VIII indicated in FIG. 7.

According to another feature or sub-combination of the invention, the arm structure 52a (FIG. 7) of the sewing machine is provided with a slider 59 which permits manual adjustment of the stitching-area position and adjustment of the automatic control of that position. The slider 59 (FIGS. 7, 8) is displaceably mounted on an arm 56 whose hub 57 is concentrically seated on a sleeve 58 fastened on a base plate 16a (FIG. 8). The arm 56 controls the slider block of the control mechanism in known manner.

FIG. 8 corresponds, generally, to FIG. 21 of copending application Serial No. 665,555 of Klaar et al., assigned to the assignee of the present invention, and the detailed description of the components therein illustrated are more fully described in that copending application. However, for purposes of better understanding the present invention, a description of the slider 59 and control member 56 is also included below.

The slider 59 is displaceably mounted on the arm 56 and carries a nose 60 (FIG. 8) which cooperates with a recess 61 in an arresting or stop plate 62. The arresting plate 62 is fastened by screws on a stop member 63 (FIGS. 7, 8). The stop member 63 is fastened to the carrier plate 16a which in turn is fastened to the machine arm structure 52a. The slider 59 carries a transmission coupling member or pin 65 coacting with a recess 66 of a lever 67 (FIG. 7). Lever 67 is rigidly joined with the pivot shaft 68 rotatably journalled in the sleeve 58, fixed to the plate 16a. When the slider 59 is placed into manual position "M" (FIG. 7), the nose 60 comes into engagement with the stop plate 62, thus placing the pin 65 out of its active position. When the slider is placed into automatic position "A" (FIG. 7), the pin 65 becomes coupled with the lever 67 and the nose 60 is placed out of its active position, thus effecting automatic control of the stitching area by means of link 116, a cam disk, and a slide block, to displace the needle bar N (FIG. 14) in accordance with the adjusted stitching area, as more fully described in the above-mentioned copending application Serial No. 665,555.

The device driving the cam disks that control the needle-bar movements and feed is also known and is described in the above-mentioned copending applications assigned to the present assignee. Consequently these devices are described hereinafter only to the extent needed for a better understanding of the present invention.

Figure 9:
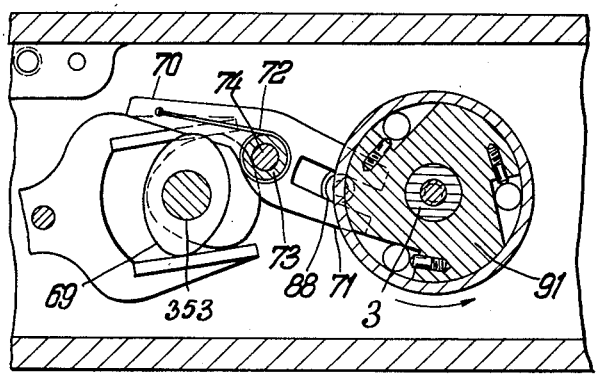
FIG. 9 shows, partly in section, a separate top view of a stepping mechanism which forms part of the same devices as represented in FIG. 7.

The device shown in FIGS. 7 to 9 has a shaft 353 (FIGS. 9, 15) driven from the main shaft in the arm structure of the sewing machine. The shaft 353 carries a double eccentric 69 (FIG. 9) acting upon an arm 70 of a bifurcated swing lever 71 which is biased counterclockwise by a spring 72 (FIGS. 7, 9) and serves as the driver of a stepping mechanism formed by a roller clutch 91. The bifurcated portion of swing lever 71 engages a driving roller 88 pivoted on the driven oscillating drive structure of the roller clutch.

The swing lever 71 is pivoted by means of a bushing 73 on a pivot pin 74 riveted to an arm (FIG. 7). The arm 75 carries a pivot pin 76 which is rotatably mounted on the plate 16a and is firmly connected by a screw 78 with an arm 77 (FIG. 7). A boss 79 in arm 77 guides itself beneath a slide bridge 81. Arm 77 carries a handle 80 which permits turning the arm 77 along a scale 82. A change in position of arm 77 about the axis of pivot pin 76 causes a corresponding angular displacement of the arm 75 and of the pivot pin 74 of swing lever 71, thus varying the active leverage of swing lever 71. In this manner, the rotating speed of the stepping mechanism 91 can be manually controlled.

The stepping mechanism 91 (FIG. 7) drives the above-described cam drive shaft 3 (FIGS. 1, 3, 7, 9). The cams 8, 9, 10 (FIG. 3) cooperate, as already mentioned, with the follower levers 11, 12, 13 respectively. As shown in FIG. 7, the cam 8 for the automatic control of the stitching-area position is in driving connection with the nose 114 (FIG. 7) of the feeler lever 11. Connected with the feeler lever 11 by means of a screw bolt 117 is a lever arm 116 whose other end is linked to the above-mentioned lever 67 by means of the bolt 118. A spring 119 acts upon the lever 115 and biases the feeler lever 11 clockwise so that its nose 114 is held against the contour of cam disc 8.

For removing from the drive shaft 3 the cam discs 8, 9, 10 and the stepping mechanism in connection therewith, there is provided a lever 187 which is pivoted on a stationary pin 191 and acts upon the extensions 184 of the feeler levers 11, 12, 13 in order to lift them off the cam discs 8, 9, 10.

In the embodiment of FIGS. 10–13, the shaft 101, corresponding to shaft 3 of FIGS. 1–9, has a key engaging a groove 103 of a bushing 300 placed upon the drive shaft 101. The bushing 300 has a flange portion 301 (FIG. 10) and is rigidly joined together with a toothed or serrated disk 305 by a cross pin 304 (FIGS. 10, 11, 12, 13). The disk 305 carries on the lower side of its cylinder-shaped portion 306 a circle of saw-like teeth 307 engaged by an entrainer 308 (FIG. 11) of a coupling lever 309. The lever 309, made of spring steel for resiliency, has ring-shaped configuration and comprises a sector 312 fastened on flange 310 by means of rivets 311 (FIG. 12) which merges with an outwardly extending sector 313 having a stop finger 314 and the above-mentioned entrainer 308. Fastened to the flange 310 by means of screws 315 (FIG. 10) are the cam disks 192, 193 and 194 which coact with the cam followers 107, 115, 124 (FIG. 13) and serve for controlling the stitching width, the stitching-area position and the material feed respectively. The cam disks 192, 193, 194 and the flange 310 are freewheelingly seated on the bushing 300 and form together with the coupling lever 309, the toothed disk 305, and the bushing 300 an independent structural unit which can readily be installed onto the drive shaft 101 and can easily be exchanged for another set of cams. The individual cam disks 192, 193, 194 can be given such a cam surface contour that they automatically control the individual side-bar and cross-tack stitches of a buttonhole or other sewing pattern as well as the sewing-over operation during a single full rotation of the cam shaft.

The finger 314 of coupling lever 309 (FIGS. 11, 13) acts upon a stop 317 which is fastened by means of a screw 316 upon a cam follower or feeler lever 115 (FIGS. 7, 13) for the automatic control of the stitching-area position. The stop 317 comprises a straight portion 318 and a portion 319 which extends angularly in the upward direction and is skewed in itself. The follower levers 107, 115 and 124 are pivotally mounted on plate 16a by means of a pivot pin 122 and carry respective extensions 183, 184, 185 acted upon by a release lever 187. The release lever 187 is rotatable about a fixed pivot pin 191 and serves for lifting the follower levers 107, 115, 124 off the respective cam disks 192, 193, 194 when the set of cam disks is being exchanged for another set.

As mentioned, the cam disk 193 (FIG. 12) cooperates with the nose 114 of the follower lever 115 for control of the stitching-area position. Connected with the follower 115 by a screw 117 is a link 116 whose other end is pivotally connected by a bolt 118 with the lever 67. A spring 119 acting upon the link 116 urges the follower 115 clockwise until the nose 114 abuts against the cam contour of cam disk 193.

The operation of the device described above with reference to FIGS. 7 to 13 is as follows.

When producing closed groups of stitch patterns, for example buttonholes in a shirt, by virtue of the automatic control performance of the set of cam disks 192, 193, 194, the rotating speed of the cam shaft 3 must be constant even though this shaft is driven from the arm shaft of the machine through a stepping mechanism 91. A change in the setting of the handle 80 (FIG. 7) would change the driving speed of the cam disks 192, 193, 194 and hence the longitudinal dimension of the buttonhole being produced. At the beginning of the sewing operation, the cam shaft 3, acting through the bushing 300 (FIG. 10) rotates the toothed disk 305 in a counter-clockwise direction, as viewed in FIG. 13. Due to the elasticity of the freely movable coupling lever 309, is biased upwardly so that the entrainer 308 of lever 309 engages one gap of the saw teeth 307 and thereby entrains the coupling lever 309 as well as the cam disks 192, 193, 194 in the same sense of rotation as disk 305.

Shortly before, or at the moment of, the termination of the sewing operation cycle during which the first side bar, the first cross tack, the second side bar and the second cross tack of the buttonhole may have been sewed and the completed buttonhole may have been sewed over as the last step of the cycle, the finger 314 of coupling lever 309 passes beneath the portion 319 of the upwardly extending stop 317 on follower lever 115. Finger 314 is thus forced downwardly, relative to FIG. 12, i.e. at right angles to the circular motion path of finger 314, so that the entrainer 308 disengages itself from the teeth 307, thereby immediately stopping the flange 310 and the cam disks 192, 193, 194 connected thereto, but without thereby interrupting the rotation of the drive shaft 101.

Tht contour design of the cam disk may be so chosen that the cam driving motion is terminated immediately before termination of the last sewing operation, that is prior to terminating the sewing-over step, with the result that the seamstress has sufficient time to bring the sewing machine to a standstill. However, if a sewing-over operation on the buttonhole is not desired, then the drive of the cam disk may be interrupted, for example, when passing from cross-tack sewing to the sewing of the next following side bar.

After completing the buttonhole in standstill condition of the cam disks, and after selecting the next location on the fabric to be provided with another buttonhole, the slider 59, placed in automatic position "A," is manually moved together with its arm 56 toward the right relative to the illustration in FIG. 7. This causes the link 116 to turn the cam follower 115 with the stop 317 counterclockwise about the pivot point 122 (FIGS. 7, 13) in opposition to the action of the tension spring 119. As a result, the finger 314 of the coupling lever 309 is released from under the part 319 and, due to its elastic pre-tensioning, is flung upwardly thus resuming its coupling position. In this position, the entrainer 308 again engages the saw teeth 307. The engagement may occur in any position of the toothed disk 305. When the slider 59 returns to its original position, relative to FIG. 7, the part 319 of stop 317 is shoved beneath the finger 314 of coupling lever 309 without disturbing the motion of the coupling lever at the beginning of the following machine operation.

It is, of course, possible and within the scope of the invention, to mount the control cam 192 for the stitching width or the control cam 194 for the material feed in such a manner, and in lieu of the cam disk 193 for the automatic control of the stitching-area position, that the appertaining follower lever 107 or 124 is provided with the stop for the coupling lever 309. Thus, with an analogous design of the correlated, not illustrated, manual control switching means, the coupling lever 309 and the cam disks 192, 193, 194 can be controlled in the same manner as described above with reference to the control effected by the cam disk 193.

Although the impact actuating means 16 has herein been illustrated as a spiral spring for storing mechanical energy, it is also within the scope of this invention, and will be apparent to those skilled in the art upon reading of this disclosure, that other impact actuating means, such as, for example, electrically controlled actuating means operated by solenoid or the like, can be used as means for actuating the release lever 39 or for rotating the control member 15 at the proper time in the cycle of cams 8, 9, 10.

It will be understood by those skilled in the art, upon a study of this disclosure, that the invetion is not limited to the embodiments particularly illustrated and described herein but may be modified in various respects without departing from the esesntial features of the invention and within the scope of the claims annexed hereto.

We claim:

1. In a zigzag sewing machine, the combination of a material feed device, an axially reciprocable needle bar laterally oscillatable for producing lateral stitches, automatic control apparatus having rotary cam means and operably linked to said material feed device and to said needle bar to control the rate of feeding of the material being sewed on and thereby the stitching length, and to move the needle bar laterally to control the stitching area and stitching width of said lateral stitches, drive means arranged to reciprocate said needle bar and to turn said rotary cam means, transmission means of variable speed ratio operably and disengageably connected to said drive means to turn said rotary cam means in variable speed correlation with the reciprocating movements of said needle bar, a selectably exchangeable cam element rotatably arranged to be turned by said transmission means, manual setting means operably connected to said transmission means for selectively setting the ratio thereof, said manual setting means having a transmission coupling member operable, in one predetermined position of said manual setting means, to disengage said transmission means from said said drive means for manual control of said lateral oscillations of said needle bar, said selectably exchangeable cam element having a cam surface and cam follower means cooperative therewith operatively linked to said transmission coupling member to move said manual setting means to said predetermined position to disengage said transmission means, a coupling device comprising a disk having a cylindrical portion, entraining means comprising a coupling lever for disenageably entraining said cylindrical portion, said coupling lever being joined to said cam means for rotation therewith, mounting means removably mountable relative to said transmission means and rotatably joined to said selectably exchangeable cam element, said mounting means, said coupling lever and said disk forming together an independent structural unit bodily removable from said transmission means, whereby said manual setting means serves for manual control of the stitching area position, for switching from manual to automatic control of the stitching area position, and also for switching on the automatic drive of said cam means from said drive means through said transmission means.

2. In a zigzag sewing machine according to claim 1, said coupling lever being operably connected to said cam element for disengageably driving the latter from said drive means, stop means for engaging said coupling lever and thus disengaging same from said drive means to arrest said cam element upon completion of a predetermined cycle of the latter, biasing means for urging said cam follower means against said cam element and for urging said manual setting means in a predetermined direction, whereby motion of said manual setting means operably linked to said cam followerer means in a direction opposite to said predetermined direction and against the force of said biasing means causes said engaging means on said cam follower means to release said coupling lever from its engaged position with said stop means and thus to again engage said coupling lever with said drive means for further rotation of said cam element.

3. In a zigzag sewing machine according to claim 1, said drive means having a drive shaft operably and disengageably connected to said rotary cam means through said coupling lever, whereby when said entraining means are disengaged from entraining said disk said drive shaft of said drive means continues to rotate while said rotary cam means are in arrested condition.

4. In a zigzag sewing machine according to claim 1, said cylindrical portion of said disk of said coupling device being provided with serrations and said coupling lever being adapted for engaging and disengaging said serrations, said mounting means comprising a bushing non-rotatably joined with said cylindrical portion and on which said rotary cam means are rotatably mounted, said bushing having key means for positive driving connection with said drive means through said transmission means, and said coupling lever having flange means fixedly attached to said rotary cam means.

5. In a zigzag sewing machine, the combination of a material feed device, an axially reciprocable needle bar laterally oscillatable for producing lateral stitches, automatic control apparatus having rotary cam means and cam follower means and operably linked to said material feed device and to said needle bar to control the rate of feeding of the material being sewed on and thereby the stitching length, and to move the needle bar laterally to control the stitching area and stitching width of said lateral stitches, drive means arranged to reciprocate said needle bar and to turn said rotary cam means, a coupling device engageable between said drive means and said rotary cam means for drivingly coupling and uncoupling the latter, said coupling device comprising a disk having a serrated cylindrical portion, entertaining means arranged for rotation with said rotary cam means and comprising a coupling lever having a circular portion provided with a tooth entertainer fixed thereon for engaging said serrated portion and movable with the latter in entrained position along a predetermined path, resilient stop means forming an extension of said coupling lever, deflecting means on said cam follower means for deflecting and placing a stressing force upon said resilient stop means in a direction at right angles to said predetermined path to disengage said tooth entrainer from said serrated portion and thus to uncouple said coupling device, and manually operable means for disengaging said deflecting means from said resilient stop means, whereby said stressing force is eliminated and said resilient stop means springs back to engage said tooth entrainer with said serrated portion and thus to place said coupling device back into coupled position.

6. In a zigzag sewing machine according to claim 5, said serrated cylindrical portion of said disk and said tooth entrainer being engageable and disengageable in any mutual position thereof, whereby said coupling device can be coupled and uncoupled at any portion of the cycle of said rotary cam means.

References Cited in the file of this patent

UNITED STATES PATENTS

| 2,966,868 | Theenhausen et. al. | Jan. 3 1961 |
| 3,055,324 | Klaar et al. | Sept. 25, 1962 |